Patented Feb. 20, 1923.

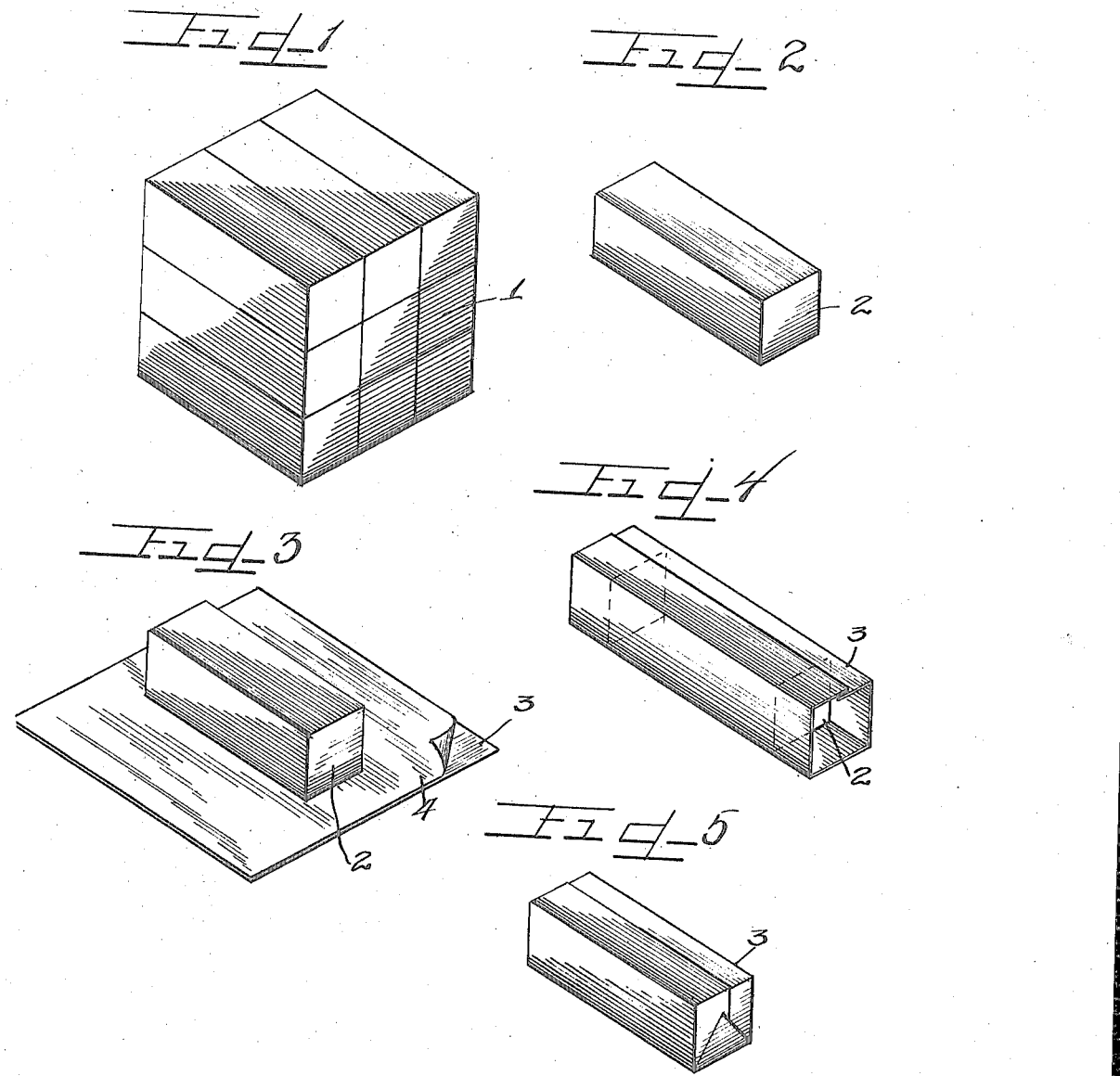

1,445,786

UNITED STATES PATENT OFFICE.

JULIUS R. MEYERS, OF EVANSTON, ILLINOIS.

PROCESS OF CHEESE PACKING.

Application filed April 30, 1921. Serial No. 465,900.

*To all whom it may concern:*

Be it known that I, JULIUS R. MEYERS, a citizen of the United States, and a resident of the city of Evanston, in the county of Cook and State of Illinois, have invented certain new and useful Improvements in a Process of Cheese Packing; and I do hereby declare that the following is a full, clear, and exact description of the same, reference being had to the accompanying drawings, and to the numerals of reference marked thereon, which form a part of this specification.

This invention relates to an improved process or method for packing or wrapping and treating cheese to protect the same and is particularly adapted for preparing any small quantity that the consumer may desire, and is related to the invention disclosed in my copending application for Process of cheese packing, filed April 21, 1921, Serial No. 463,166, which issued in Patent No. 1,415,944, on May 16th, 1922.

As pointed out in my prior application, above referred to, it has been the practice heretofore in making individual blocks of cheese, to first place the curds within a large press or mold and then from a period of from eight to twelve hours gradually, or from time to time, increase the pressure thereof to press out the whey and thereby form a large green cheese. This green cheese is then removed from the press or mold and cut into a plurality of small blocks of uniform size and weight. The small blocks of cheese are then placed into smaller molds and again pressed in order to properly form them. It will be obvious, of course, that the curing process may be completed before the large block of cheese is cut into the smaller blocks or after, as desired. If the curing process is carried on after the large block is cut, a rind is formed around each of the individual blocks which results in considerable waste at the time the cheese is consumed, but this is prevented by first wrapping the blocks according to my invention.

I am aware that wrapping cheese in covers of tin-foil is old and well known, but such wrappers, as heretofore applied, have not been bonded or fused with the casein at the outer surfaces of the cheese, and were therefore easily liable to become loose or broken away during handling or shipping. In my prior application for patent heretofore referred to, I have described a process consisting in wrapping a block of cheese with a metal foil and subsequently applying heat to the foil so as to form a bond between the cheese and the foil. In the present process, I combine thin paper or a protective lining with the metal foil which may be affixed or cemented thereto, and apply the wrapping to the cheese with the lining in contact with the cheese. The melted casein will readily fuse with the lining forming a bond which prevents a rind from being formed around the surface of the cheese, and at the same time forms a protective seal for preserving the cheese.

It is an object of this invention to provide a method for wrapping and treating cheese to protect same that will eliminate the objectionable rind, waste and shrinkage, and preserve the cheese in a good wholesome edible state.

My invention comprises the novel method and matters hereinafter described and more particularly pointed out in the appended claims.

In the accompanying drawings, which illustrate a preferred embodiment of my invention, and in which similar reference numerals refer to similar features in the different views:

Figure 1 represents a large block of cheese cut into pieces or smaller blocks of uniform size.

Figure 2 is a perspective view of an individual block of cheese cut from the large block.

Figure 3 illustrates the wrappers used in combination with the block shown in Figure 2.

Figure 4 illustrates a step in the wrapping process.

Figure 5 illustrates the complete wrapped block.

As shown in the drawings:

The block 1 of cheese shown in Figure 1, which may be either green or cured, is cut into a plurality of pieces according to the size and weight desired by the trade. The small block or piece 2 shown in Figure 2 represents such a piece.

The method of wrapping the block of cheese consists in taking a sheet of metal foil 3 and associating therewith a thin paper or protective lining 4, which is preferably affixed or cemented to the inner side of the metal foil so as to be combined therewith without relative movement thereto, as shown in Figure 3. The combined paper and foil are then wrapped or folded around the piece of cheese, as shown in Figures 4 and 5, with the paper lining next to the cheese. The wrapped block or piece of cheese is next subjected to heat treatment to fuse or melt the casein on the outer surfaces of the cheese to cause the same to form a bond between it and the wrapper, and at the same time form a protective coating for preserving the cheese. The method of heating the wrapped blocks may be effected in various ways, but I preferably use hot plates with which the wrapped pieces of cheese are brought into contact.

This process or method produces a protective coating over the cheese and causes a firm adhesion of the wrapper to the cheese and prevents the formation of a rind on the surface of the wrapped cheese. It will be obvious that cheese that is wrapped and treated according to my invention has no waste, and that the entire block of cheese is edible. It is characteristic of my invention that cheese wrapped in accordance with my invention can be clearly cut avoiding tearing of the covering which frequently occurred in the past, with the consequent exposure of the outer surfaces of the cheese where decay and deterioration first sets in. It is further characteristic of my invention that the small green blocks of cheese may be wrapped and then cured without the formation of a rind, so that no waste will occur in using the cheese.

I am aware that numerous details of construction may be varied through a wide range without departing from the principles of this invention, and I therefore do not purpose limiting the patent granted otherwise than necessitated by the prior art.

I claim as my invention.

1. The process of protecting cheese, consisting in wrapping the same in combined sheets of paper and metal foil and then subjecting the same to heat treatments and fusing the paper wrapping to the outer surfaces of the cheese.

2. The process of protecting cheese, consisting of wrapping the cheese in a wrapper of thin paper and metal foil, and applying heat thereto to melt the casein at the surfaces of the cheese and form a bond between the cheese and paper wrapper.

3. The process of protecting cheese consisting of wrapping the cheese in metal foil having a fibrous lining and applying heat thereto and fusing the fibrous lining with the outer surface of the cheese.

In testimony whereof I have hereunto subscribed my name in the presence of two subscribing witnesses.

JULIUS R. MEYERS.

Witnesses:
CHARLES W. HILLS, Jr.,
CARLTON HILL.